US012572179B2

(12) United States Patent
Xu

(10) Patent No.: US 12,572,179 B2
(45) Date of Patent: Mar. 10, 2026

(54) CASING ASSEMBLY, MONITOR AND NOTEBOOK COMPUTER

(71) Applicant: WISTRON CORP., New Taipei City (TW)

(72) Inventor: Chaocan Xu, New Taipei City (TW)

(73) Assignee: WISTRON CORP., New Taipei City (TW)

( * ) Notice: Subject to any disclaimer, the term of this patent is extended or adjusted under 35 U.S.C. 154(b) by 369 days.

(21) Appl. No.: 18/300,465

(22) Filed: Apr. 14, 2023

(65) Prior Publication Data

US 2024/0192731 A1 Jun. 13, 2024

(30) Foreign Application Priority Data

Dec. 7, 2022 (CN) .......................... 202211563597.1

(51) Int. Cl.
*G06F 1/16* (2006.01)

(52) U.S. Cl.
CPC .......... *G06F 1/1654* (2013.01); *G06F 1/1616* (2013.01); *G06F 1/1681* (2013.01)

(58) Field of Classification Search
CPC ..................................... H05K 7/00; G06F 1/16
See application file for complete search history.

(56) References Cited

U.S. PATENT DOCUMENTS

| 7,382,604 B2 * | 6/2008 | Minaguchi ............ | G06F 1/1616 |
| | | | 345/173 |
| 8,699,214 B2 * | 4/2014 | Sakuma ................ | G06F 1/1662 |
| | | | 345/169 |

| 9,013,886 B2 | 4/2015 | Park et al. | |
| 11,216,028 B1 * | 1/2022 | Cheng ................... | G06F 1/1656 |
| 11,324,127 B2 * | 5/2022 | Liu ........................ | G06F 3/0221 |
| 2014/0307380 A1 * | 10/2014 | Nakamura ............ | G06F 1/1683 |
| | | | 361/679.27 |
| 2022/0276681 A1 | 9/2022 | Zhu et al. | |
| 2024/0301992 A1 * | 9/2024 | Hudgins ............... | G06F 1/1626 |

FOREIGN PATENT DOCUMENTS

CN 114138062 A 3/2022

OTHER PUBLICATIONS

1 TW Office Action dated Feb. 5, 2023 in Taiwan application No. 111149886.

* cited by examiner

*Primary Examiner* — Anthony M Haughton
*Assistant Examiner* — Rashen E Morrison
(74) *Attorney, Agent, or Firm* — McClure, Qualey & Rodack, LLP

(57) ABSTRACT

A casing assembly includes a casing, a cover and a bezel. The casing is configured to support a display panel and configured to be connected to a pivot component. The casing has a bottom surface, a side surface, a first mount structure and a second mount structure, the bottom surface is connected to the side surface, and the first mount structure and the second mount structure are respectively located at the bottom surface and the side surface. The cover includes a covering portion, a first mount portion and a second mount portion. The first mount portion and the second mount portion are connected to the covering portion, the first mount portion and the second mount portion are respectively connected to the first mount structure and the second mount structure of the casing. The bezel is removably connected to the cover and the casing.

16 Claims, 8 Drawing Sheets

CASING ASSEMBLY, MONITOR AND NOTEBOOK COMPUTER

CROSS-REFERENCE TO RELATED APPLICATIONS

This non-provisional application claims priority under 35 U.S.C. § 119(a) on Patent Application No(s). 202211563597.1 filed in China on Dec. 7, 2022, the entire contents of which are hereby incorporated by reference.

TECHNICAL FIELD

The disclosure relates to a casing assembly, a monitor and a notebook computer.

BACKGROUND

As progress of technology and requirement of aesthetic appearance of notebook computer, a bezel of a monitor of the notebook computer become narrower, but this may cause the bezel to be easily damaged when the bezel is detached for the maintenance of the display panel, and thus the damaged bezel is required to be replaced during the maintenance of the display panel.

However, the bezel is fixed to a cover covering a hinge assembly of the monitor, such that when the damaged bezel is scrapped, the undamaged cover fixed to the damaged bezel is also scrapped, which causes the waste of the cover and increases the cost of the maintenance. Therefore, how to solve the aforementioned issue is one of the crucial topics in this field.

SUMMARY

The disclosure provides a casing assembly, a monitor and a notebook computer which are capable of preventing the cover from being wasted and preventing the cost of the maintenance from increasing.

One embodiment of the disclosure provides a casing assembly. The casing assembly is adapted to be connected to a host assembly via at least one pivot component and configured to support a display panel. The casing assembly includes a casing, a cover and a bezel. The casing is configured to support the display panel and configured to be connected to the at least one pivot component. The casing has a bottom surface, a side surface, a first mount structure and a second mount structure, the bottom surface is connected to the side surface, and the first mount structure and the second mount structure are respectively located at the bottom surface and the side surface. The cover includes a covering portion, a first mount portion and a second mount portion. The first mount portion and the second mount portion are connected to the covering portion, the first mount portion and the second mount portion are respectively connected to the first mount structure and the second mount structure of the casing. The bezel is removably connected to the cover and the casing. The display panel is located between the bezel and the casing.

Another embodiment of the disclosure provides a monitor. The monitor is adapted to be connected to a host assembly via at least one pivot component. The monitor includes a casing assembly and a display panel. The casing assembly includes a casing, a cover and a bezel. The casing is configured to be connected to the at least one pivot component. The casing has a bottom surface, a side surface, a first mount structure and a second mount structure, the bottom surface is connected to the side surface, and the first mount structure and the second mount structure are respectively located at the bottom surface and the side surface. The cover includes a covering portion, a first mount portion and a second mount portion. The first mount portion and the second mount portion are connected to the covering portion, the first mount portion and the second mount portion are respectively connected to the first mount structure and the second mount structure of the casing. The bezel is removably connected to the cover and the casing. The display panel is located between the bezel and the casing.

Still another embodiment provides a notebook computer. The notebook computer includes a host assembly, at least one pivot component and a monitor. One end of the pivot component is connected to the host assembly. The monitor includes a casing assembly and a display panel. The casing assembly includes a casing, a cover and a bezel. Another end of the pivot components is connected to the casing. The casing has a bottom surface, a side surface, a first mount structure and a second mount structure, the bottom surface is connected to the side surface, and the first mount structure and the second mount structure are respectively located at the bottom surface and the side surface. The cover includes a covering portion, a first mount portion and a second mount portion. The first mount portion and the second mount portion are connected to the covering portion, the first mount portion and the second mount portion are respectively connected to the first mount structure and the second mount structure of the casing. The bezel is removably connected to the cover and the casing. The display panel is located between the bezel and the casing.

According to the casing assembly, the monitor and the notebook computer as disclosed in the above embodiments, the bezel is removably mounted on the cover, such that when the bezel is detached from the casing for the maintenance of the display panel, the cover is not detached from the casing along with the bezel. Therefore, even if the bezel is damaged during the detachment process and required to be replaced, the cover which is not detached from the casing along with the bezel is not required to be replaced; that is, the undamaged cover is not required to be scrapped along with the damaged bezel, thereby preventing the cover from being wasted and preventing the cost of the maintenance from increasing.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
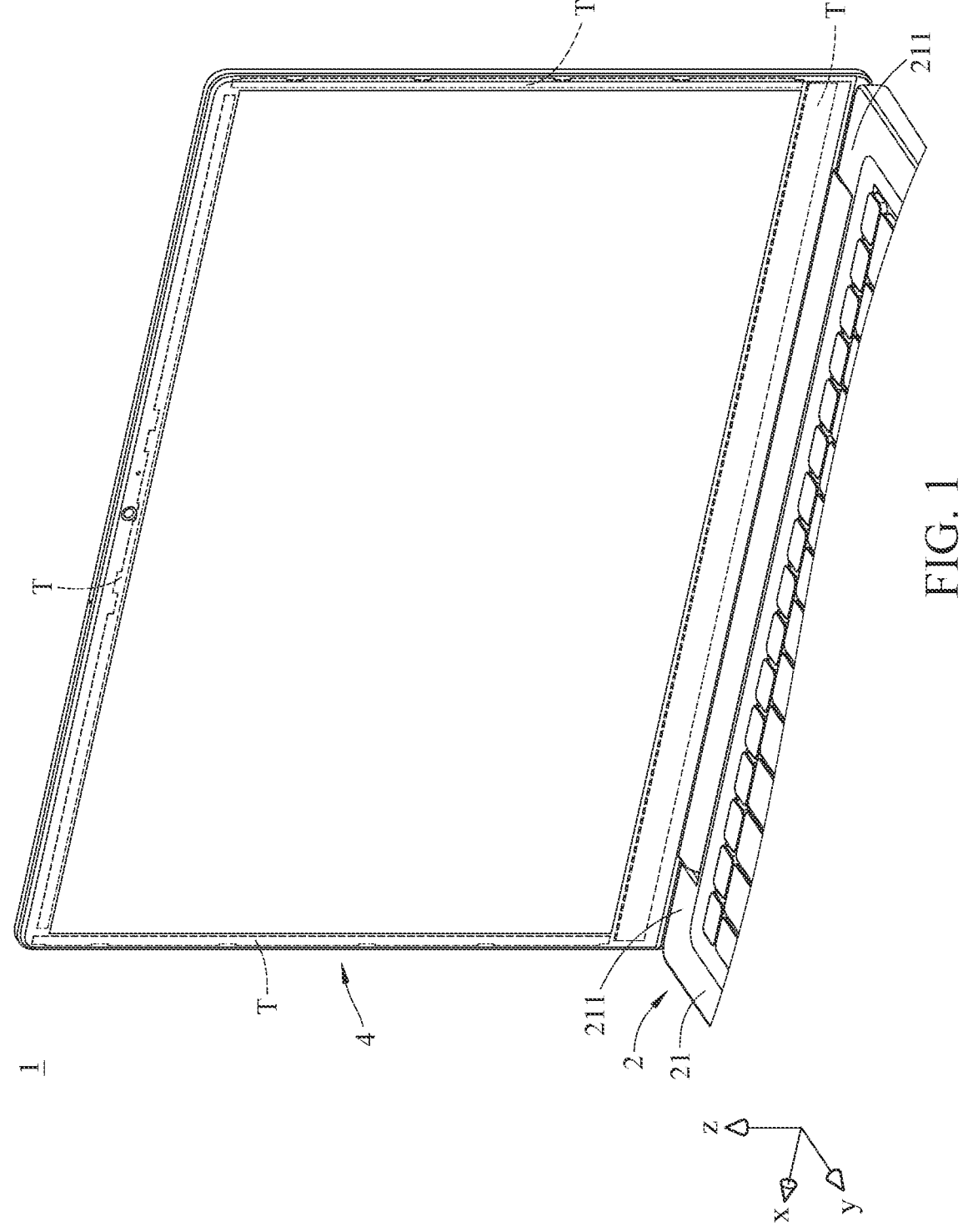
FIG. 1 is a partial perspective view of a notebook computer according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
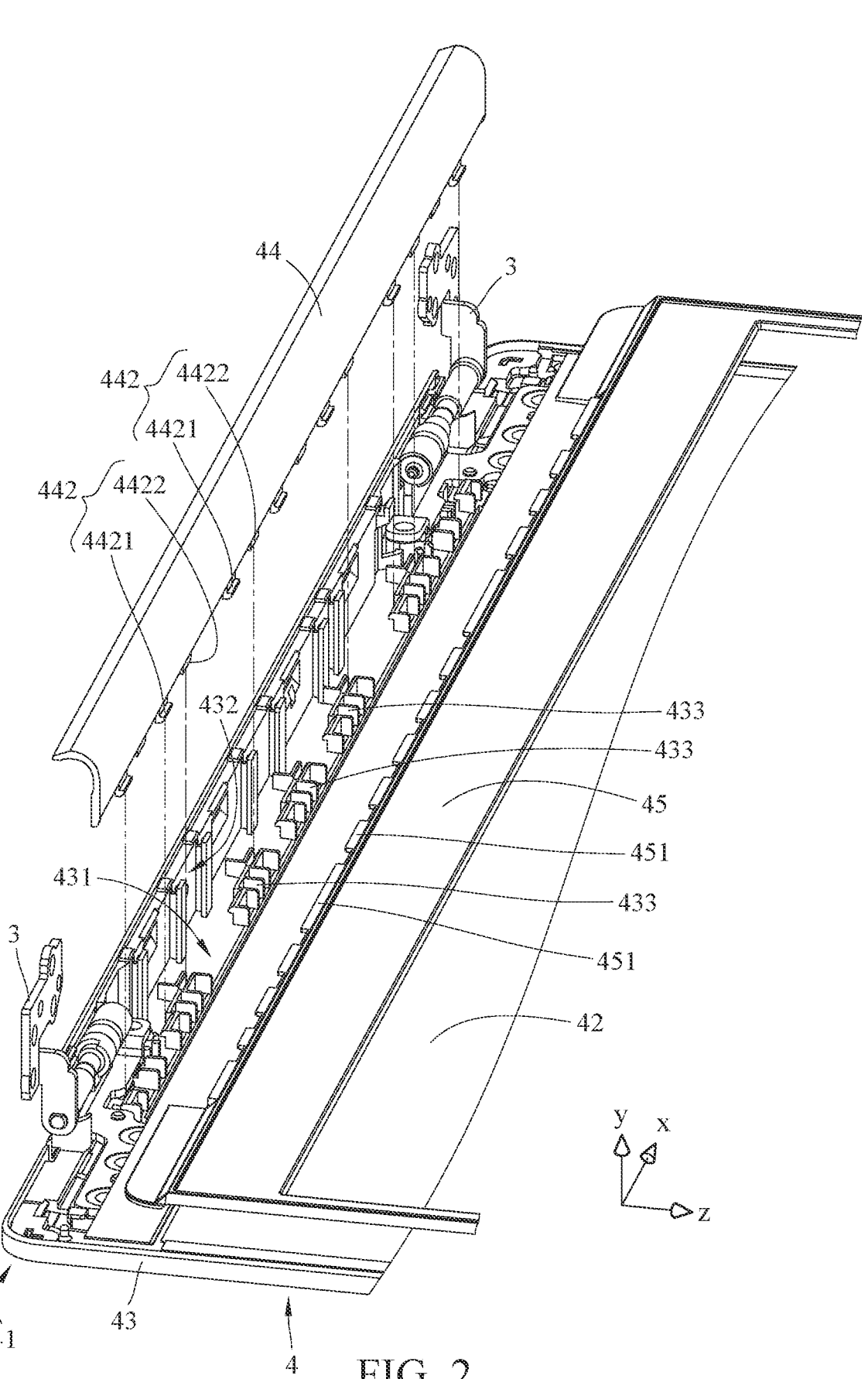
FIG. 2 is a partial exploded view of a monitor of the notebook computer in FIG. 1.

Refer to FIGS. 1 and 2. FIG. 1 is a partial perspective view of a notebook computer 1 according to a first embodiment of the disclosure, and FIG. 2 is a partial exploded view of a monitor of the notebook computer 1 in FIG. 1.

In this embodiment, the notebook computer 1 includes a host assembly 2, two pivot components 3 and a monitor 4. The host assembly 2, for example, includes a casing 21, a motherboard, a fan and so on. In order to clearly illustrate the structure of the monitor 4 emphasized in the disclosure, the detailed structure of the host assembly 2 is omitted in the figures, and the following paragraphs briefly introduce the host assembly 2.

The casing 21 of the host assembly 2 has two mount portions 211 located opposite to each other, and the two mount portions 211 are respectively located at two corners of one side of the casing 21 of the host assembly 2. The pivot components 3 are, for example, hinge structures. Ends of the two pivot components 3 are respectively mounted into the two mount portions 211 of the casing 21 of the host assembly 2.

The monitor 4 includes a casing assembly 41 and a display panel 42. The casing assembly 41 includes a casing 43, a cover 44 and a bezel 45. Other ends of the two pivot components 3 are mounted in the casing 43 and are respectively located at two corners of one side of the casing 43. The display panel 42 is fixed to the casing 43 so as to be supported by the casing 43.

Note that the quantity of the pivot components 3 is not restricted in the disclosure and may be modified to be one in some other embodiments.

Figure 3:
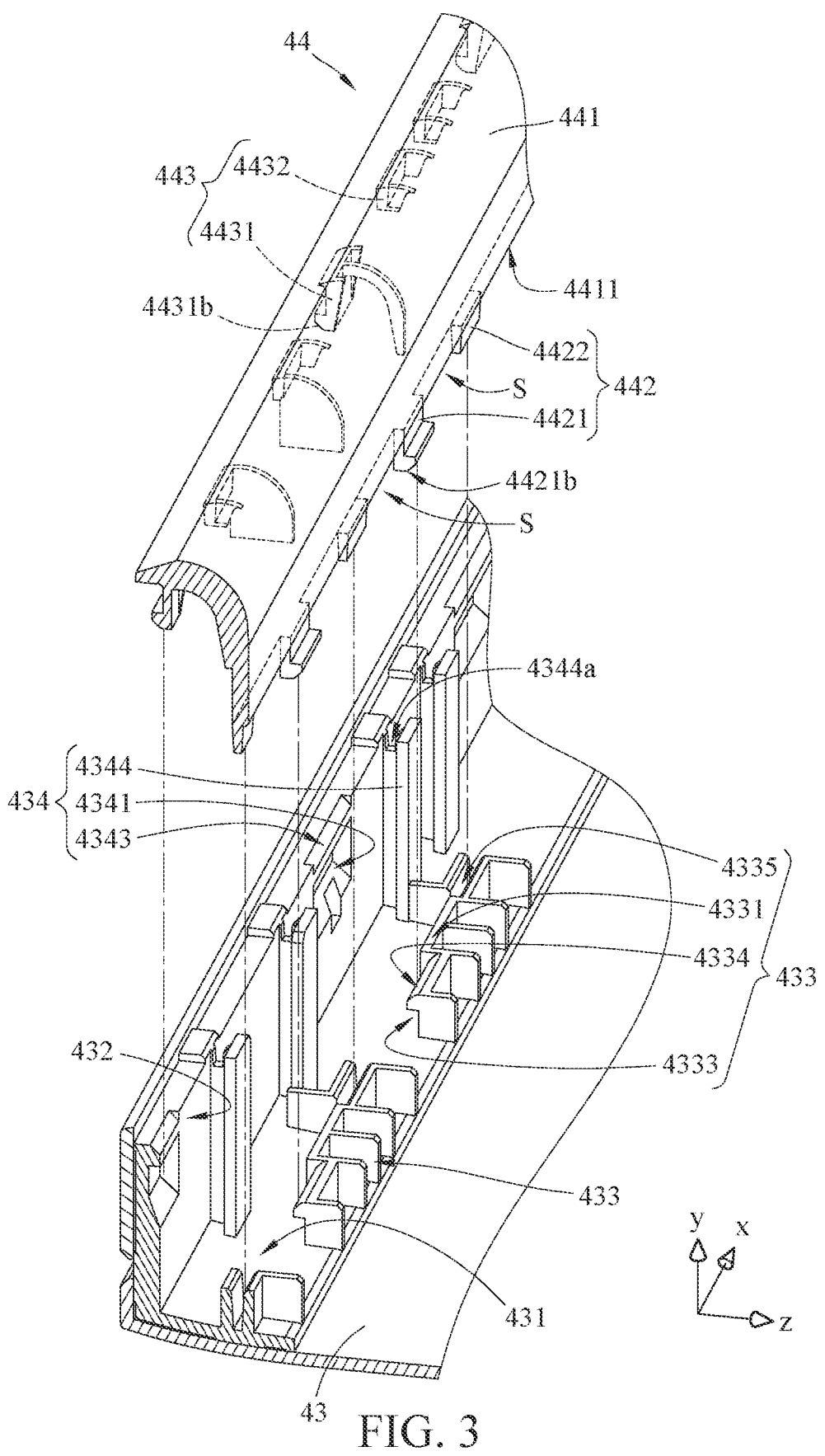
FIG. 3 is a partial and enlarged exploded view of the monitor of the notebook computer in FIG. 2.
Figure 4:
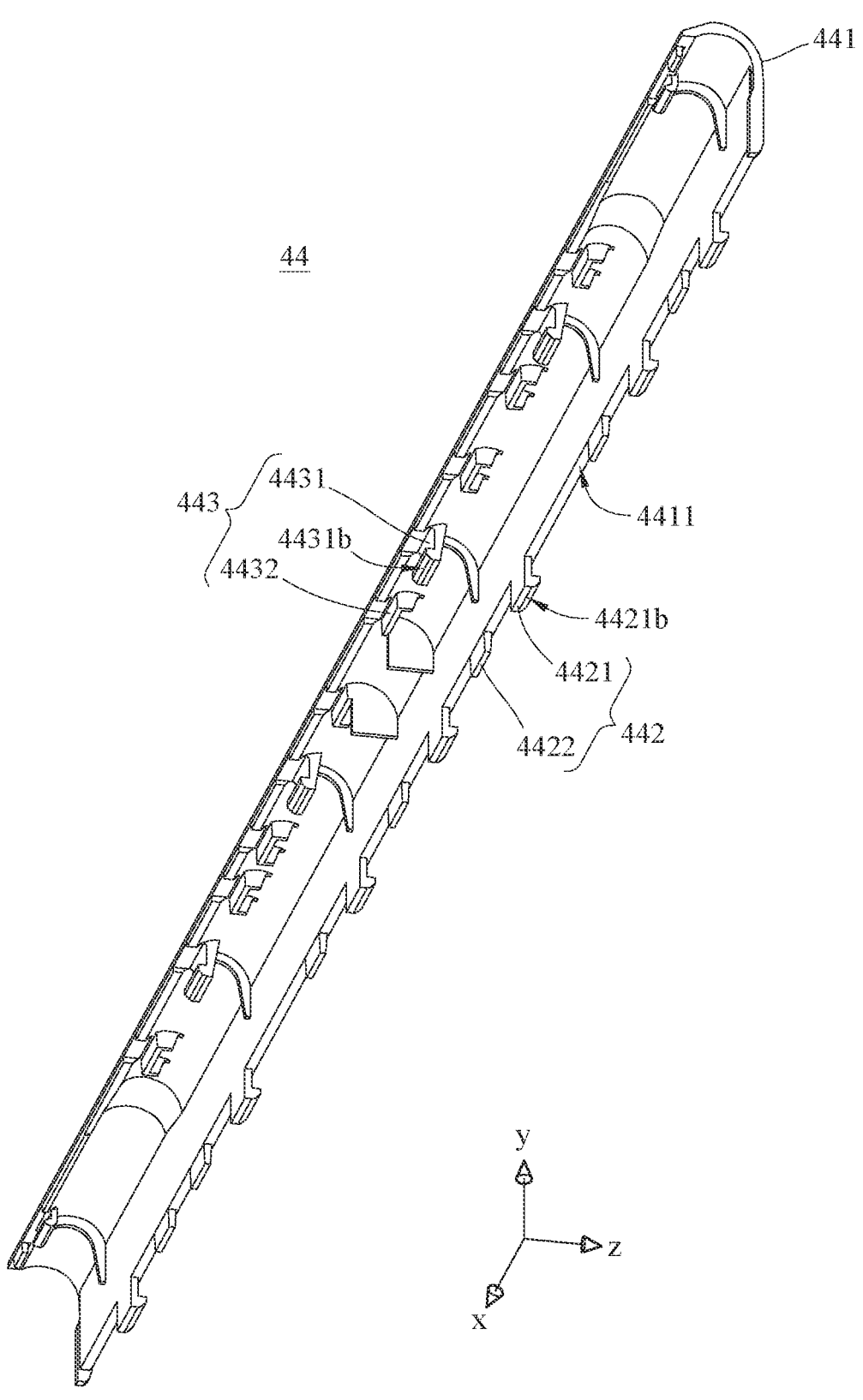
FIG. 4 is a perspective view of a cover of the monitor in FIG. 2.
Figure 5:
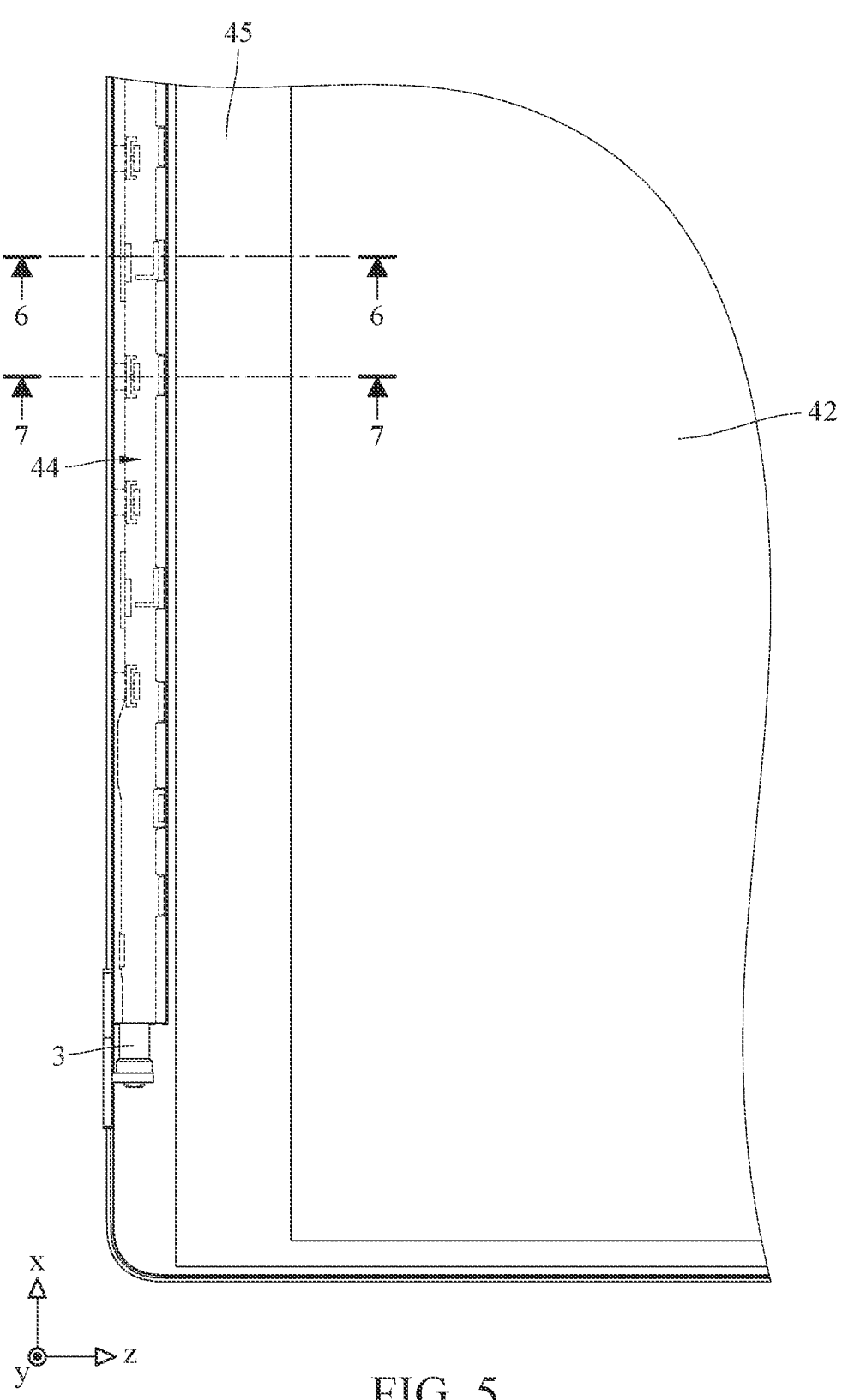
FIG. 5 is a partial top view of the monitor in FIG. 2.
Figure 6:
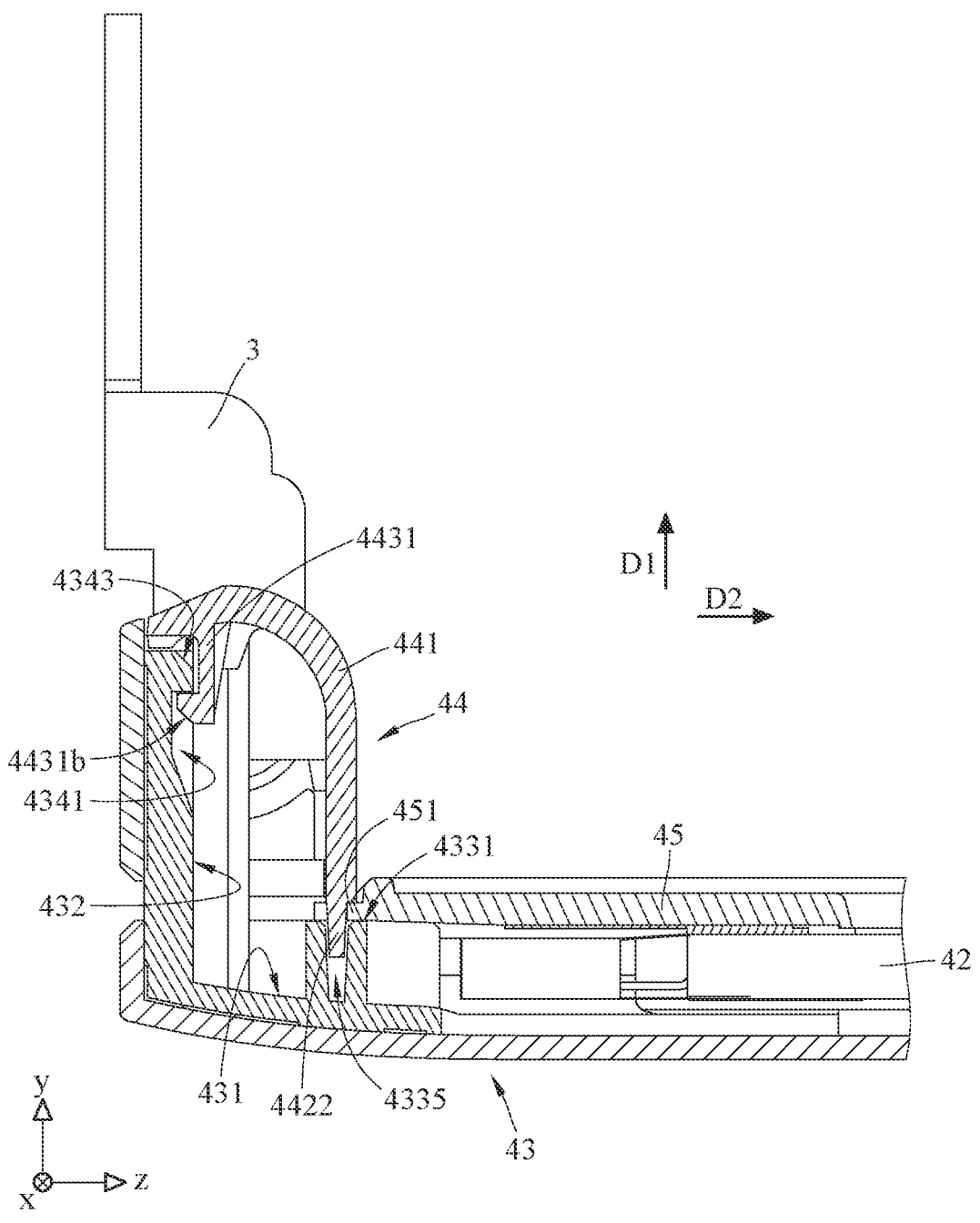
FIG. 6 is a partial cross-sectional view of the monitor in FIG. 5 taken along a line 6-6.
Figure 7:
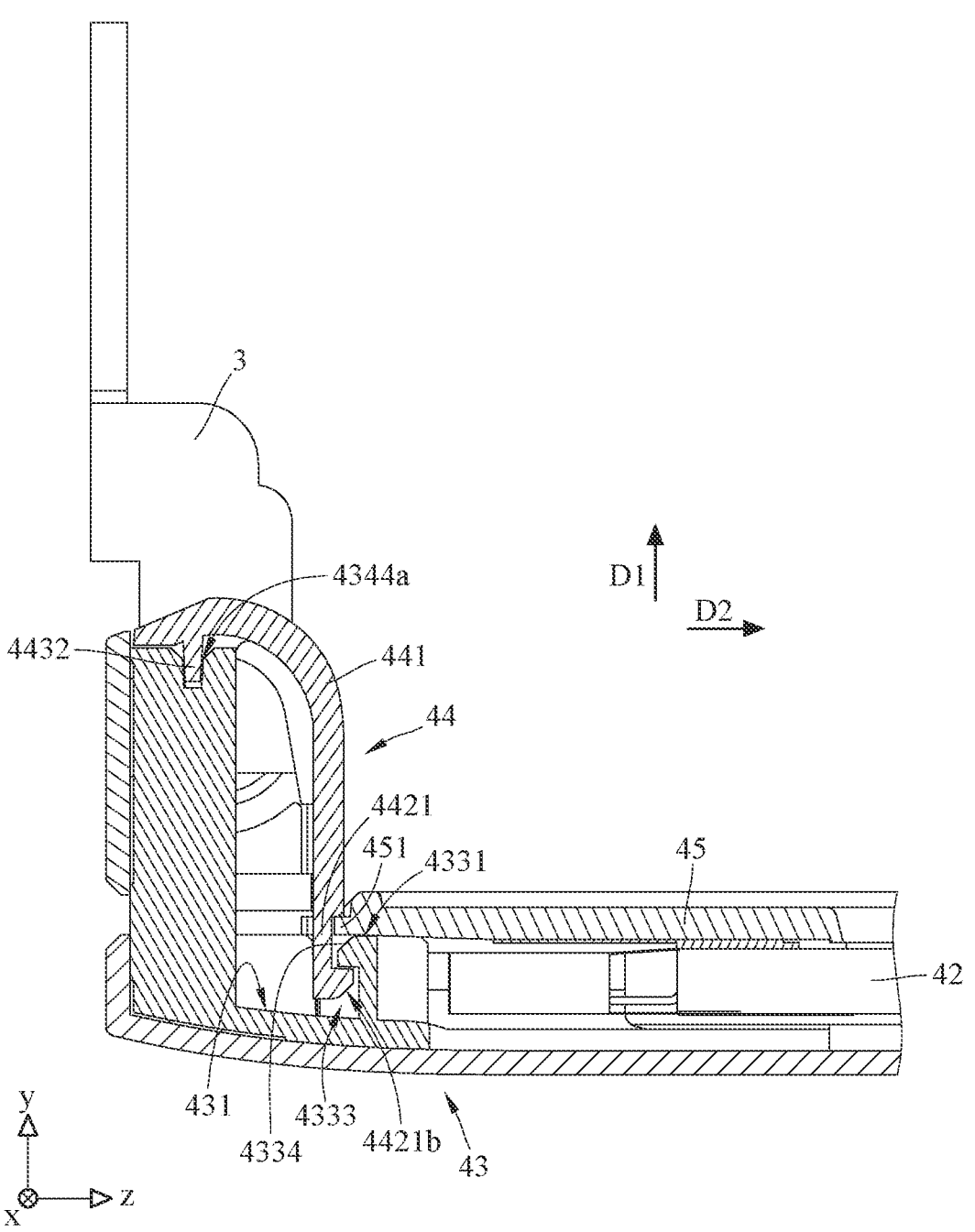
FIG. 7 is a partial cross-sectional view of the monitor in FIG. 5 taken along a line 7-7.

Then, refer to FIGS. 3 to 6. FIG. 3 is a partial and enlarged exploded view of the monitor of the notebook computer 1 in FIG. 2, FIG. 4 is a perspective view of the cover 44 of the monitor 4 in FIG. 2, FIG. 5 is a partial top view of the monitor 4 in FIG. 2, FIG. 6 is a partial cross-sectional view of the monitor 4 in FIG. 5 taken along a line 6-6, and FIG. 7 is a partial cross-sectional view of the monitor 4 in FIG. 5 taken along a line 7-7.

The casing 43 has a bottom surface 431, a side surface 432, a plurality of first mount structures 433 and a plurality of second mount structures 434. The side surface 432 is connected to one side of the bottom surface 431 located close to the pivot components 3, and the side surface 432 and the bottom surface 431 respectively face two different directions. Specifically, the side surface 432, for example, stands on the bottom surface 431.

The first mount structures 433 protrude from the bottom surface 431 of the casing 43, and the first mount structures 433 are, for example, spaced apart from one another. The first mount structures 433 are similar to each other in structure, and thus the following paragraphs merely introduce one of them in detail. The first mount structure 433 has a support surface 4331, a first recess 4333, a first inclined guide surface 4334 and a first groove 4335. The support surface 4331 is located at one side of the first mount structure 433 located opposite to the bottom surface 431 of the casing 43. The first inclined guide surface 4334 is located farther away from the bottom surface 431 of the casing 43 than the first recess 4333. The first groove 4335 and the first recess 4333 are spaced apart from each other, and the first groove 4335 is recessed from the support surface 4331.

The second mount structures 434 are located at the side surface 432 of the casing 43, and the second mount structures 434 are, for example, spaced apart from one another. The second mount structures 434 are similar to each other in structure, and thus the following paragraphs merely introduce one of them in detail. The second mount structure 434 has a second recess 4341, a second inclined guide surface 4343 and a support rib 4344. The second recess 4341 is recessed from the side surface 432 of the casing 43. The second inclined guide surface 4343 is located farther away from the bottom surface 431 of the casing 43 than the second recess 4341. The support rib 4344 protrudes from the side surface 432 of the casing 43 and is located at one side of the second recess 4341, and the support rib 4344 has a second groove 4344a.

The cover 44 includes a covering portion 441, a plurality of first mount portions 442 and a plurality of second mount portions 443. The covering portion 441 is a curved plate, and the covering portion 441 has an end surface 4411 located at one end thereof.

The first mount portions 442 protrude from the end surface 4411 of the covering portion 441 and are spaced apart from one another. Each of the first mount portions 442 includes a first hook structure 4421 and a first protrusion 4422, and the first hook structure 4421 has an inclined guide surface 4421b.

The second mount portions 443 protrude from another end of the covering portion 441 and are spaced apart from one another. Specifically, each of the second mount portions 443 includes a second hook structure 4431 and a second protrusion 4432, and the second hook structure 4431 has an inclined guide surface 4431b.

In this embodiment, the inclined guide surface 4421b of the first hook structure 4421 corresponds to the first inclined guide surface 4334 of the first mount structure 433, the first hook structure 4421 is engaged into the first recess 4333 of the first mount structure 433, and the first protrusion 4422 is inserted into the first groove 4335. In addition, the inclined guide surface 4431b of the second hook structure 4431 corresponds to the second inclined guide surface 4343 of the second mount structure 434, the second hook structure 4431 is engaged into the second recess 4341 of the second mount structure 434, and the second protrusion 4432 is inserted into the second groove 4344a.

Specifically, during installation of the first hook structure 4421 and the second hook structure 4431 into the first recess 4333 of the first mount structure 433 and the second recess 4341 of the second mount structure 434, the inclined guide surface 4421b of the first hook structure 4421 and the inclined guide surface 4431b of the second hook structure 4431 are firstly in contact with the first inclined guide surface 4334 of the first mount structure 433 and the second inclined guide surface 4343 of the second mount structure 434, respectively. Then, the cover 44 is pressed downward, such that the first inclined guide surface 4334 of the first mount structure 433 and the second inclined guide surface 4343 of the second mount structure 434 respectively press against the inclined guide surface 4421*b* of the first hook structure 4421 and the inclined guide surface 4431*b* of the second hook structure 4431 so as to elastically deform the first hook structure 4421 and the second hook structure 4431. After the first hook structure 4421 and the second hook structure 4431 respectively enter into the first recess 4333 and the second recess 4341, the first hook structure 4421 and the second hook structure 4431 rebound, such that the first hook structure 4421 and the second hook structure 4431 are respectively engaged into the first recess 4333 of the first mount structure 433 and the second recess 4341 of the second mount structure 434. At this moment, the first protrusion 4422 and the second protrusion 4432 are respectively inserted into the first groove 4335 and the second groove 4344*a*.

In this embodiment, the quantity of the cover 44 is only one, and the cover 44 is located between the two mount portions 211 of the casing 21 of the host assembly 2, such that the notebook computer 1 is in a three-section-typed hinge design, and the monitor 4 is pivotable relative to the host assembly 2 in a range from 0 degree to 180 degrees, but the disclosure is not limited thereto; in some other embodiments, there may be not only one cover between the two mount portions of the host assembly.

In this embodiment, the cooperation of the inclined guide surface 4421*b* of the first hook structure 4421 and the first inclined guide surface 4334 of the first mount structure 433 and the cooperation of the inclined guide surface 4431*b* of the second hook structure 4431 and the second inclined guide surface 4343 of the second mount structure 434 can help the first hook structure 4421 and the second hook structure 4431 to enter into the first recess 4333 and the second recess 4341, respectively.

Note that the inclined guide surface 4421*b* of the first hook structure 4421 and the first inclined guide surface 4334 of the first mount structure 433 are optional structures; in some other embodiments, only one of the first hook structure and the first mount structure may have the inclined guide surface, or both of them may not have the inclined guide surface. Similarly, only one of the second hook structure and the second mount structure may have the inclined guide surface, or both of them may not have the inclined guide surface.

Moreover, the first hook structure 4421 and the second hook structure 4431 are respectively engaged into the first recess 4333 and the second recess 4341, such that the cover 44 is unable to be moved along a vertical direction D1 away from the bottom surface 431 of the casing 43, thereby preventing the cover 44 from unwantedly being removed from the casing 43.

Furthermore, the first protrusion 4422 and the second protrusion 4432 are respectively inserted into the first groove 4335 and the second groove 4344*a*, such that the cover 44 is unable to be moved along a horizontal direction D2 perpendicular to the vertical direction D1, thereby positioning the cover 44 in the horizontal direction D2.

Note that each of the first mount portions 442 of the cover 44 is not restricted to including the first hook structure 4421 and the first protrusion 4422. In some other embodiments, each of the first mount portions of the cover may not have the first protrusion; that is, each of the first mount portions of the cover may be the first hook structure. Similarly, each of the second mount portions of the cover may not have the second protrusion; that is, each of the second mount portions of the cover may be the second hook structure. In such a case, the first groove of each of the first mount structures of the casing may be omitted, and the second groove of each of the second mount structures of the casing may be omitted. Alternatively, in another embodiment, each of the first mount portions of the cover may not have the first hook structure (that is, each of the first mount portions of the cover may be the first protrusion), and each of the second mount portions of the cover may not have the second hook structure (that is, each of the second mount portions of the cover may be the second protrusion). In such a case, the first recess of each of the first mount structures of the casing may be omitted, and the second recess of each of the second mount structures of the casing may be omitted.

Note that the quantities of the first mount portions 442 and the second mount portions 443 of the cover 44 are not restricted and may be modified to be one in some other embodiments. In such a case, the casing may have only one first mount structure and only one second mount structure.

Figure 8:
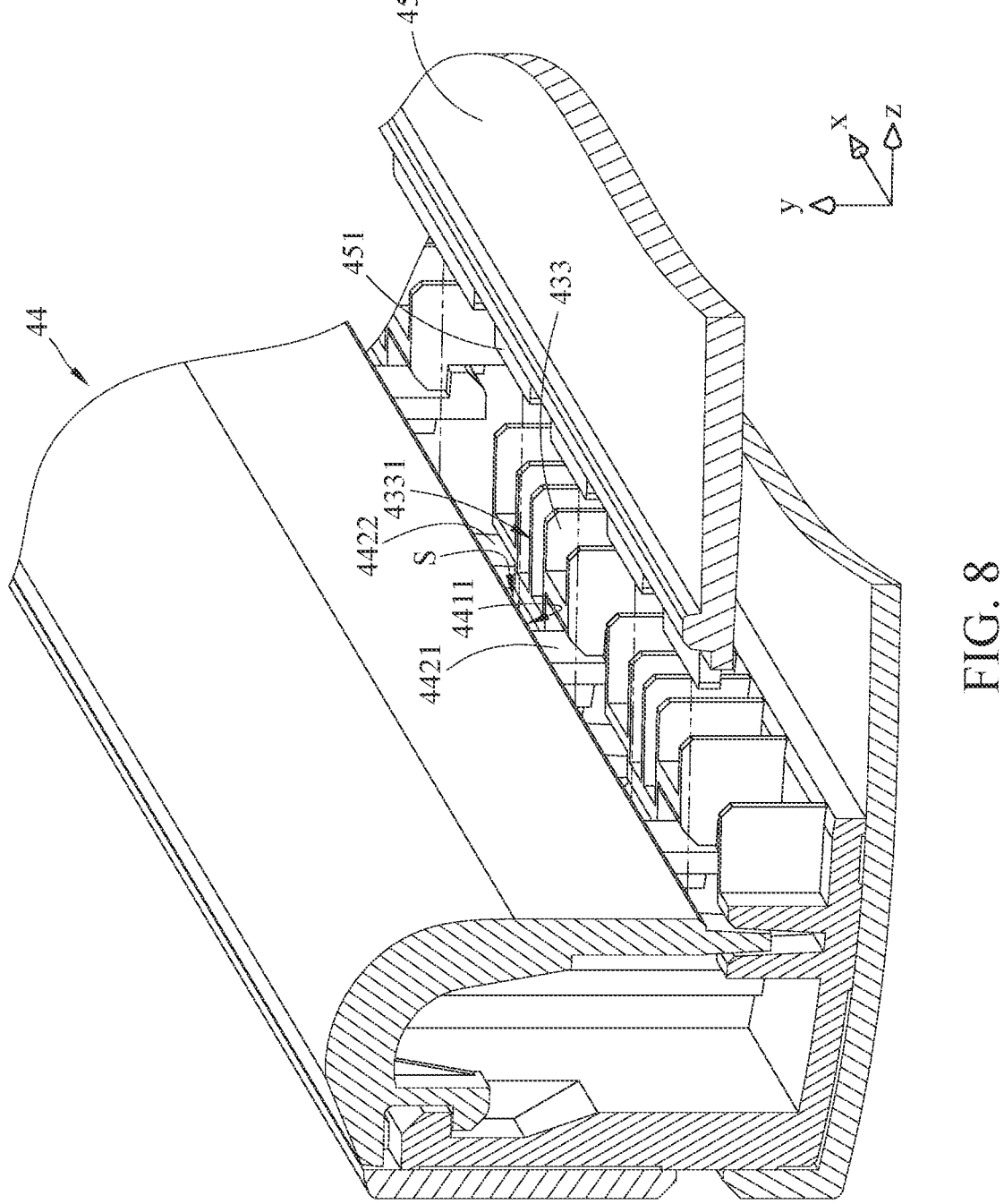
FIG. 8 is a partial exploded view of the monitor of the notebook computer in FIG. 2 when a bezel is separated from the cover of the monitor.

Then, refer to FIG. 8. FIG. 8 is a partial exploded view of the monitor 4 of the notebook computer 1 in FIG. 2 when the bezel 45 is separated from the cover 44 of the monitor 4.

In this embodiment, the end surface 4411 of the cover 44 faces the support surfaces 4331 of the first mount structures 433 and is spaced apart from the support surfaces 4331 of the first mount structures 433, and the first hook structures 4421 and the first protrusions 4422 divide a room between the end surface 4411 of the cover 44 and the support surfaces 4331 of the first mount structures 433 into a plurality of insertion slots S. The bezel 45 has a plurality of insertion protrusions 451, and the insertion protrusions 451 are respectively and removably inserted into the insertion slots S. A periphery of the bezel 45 is fixed to the display panel 42 via double-sided tapes T (shown in FIG. 1) so as to be indirectly fixed to the casing 43, and bezel 45 surrounds the display panel 42.

Note that the bezel 45 is not restricted to being fixed to casing 43 via the double-sided tape T; in some other embodiments, the bezel may be fixed to the casing via screws or a snap-fit means.

In this embodiment, the insertion protrusions 451 of the bezel 45 are respectively and removably inserted into the insertion slots S, such that when the bezel 45 is detached from the casing 43 for the maintenance of the display panel 42, the cover 44 is not detached from the casing 43 along with the bezel 45. Therefore, even if the bezel 45 is damaged during the detachment process and required to be replaced, the cover 44 which is not detached from the casing 43 along with the bezel 45 is not required to be replaced; that is, the undamaged cover 44 is not required to be scrapped along with the damaged bezel 45, thereby preventing the cover 44 from being wasted and preventing the cost of the maintenance from increasing.

In addition, the support surfaces 4331 of the first mount structures 433 can guide the bezel 45 for enabling the insertion protrusions 451 of the bezel 45 to be smoothly inserted into the insertion slots S, and the support surfaces 4331 of the first mount structures 433 can support the bezel 45 after the insertion protrusions 451 of the bezel 45 are inserted into the insertion slots S.

Note that the insertion slots S are not restricted to be formed by the first hook structures 4421, the first protrusions 4422, the end surface 4411 of the cover 44 and the support surfaces 4331 of the first mount structures 433; in some other embodiments, the first mount structures may not have the support surfaces, the insertion slots may be directly formed on the cover, and the casing may have other structures to guide the bezel during the installation thereof and support the bezel after the installation of the bezel.

In this embodiment, the bezel 45 is removable from the cover 44 via the cooperation of the insertion protrusions 451 and the insertion slots S, but the disclosure is not limited thereto; in some other embodiments, the bezel may be removably mounted on the cover via other means, such as screws or adhesive.

According to the casing assembly, the monitor and the notebook computer as disclosed in the above embodiments, the bezel is removably mounted on the cover, such that when the bezel is detached from the casing for the maintenance of the display panel, the cover is not detached from the casing along with the bezel. Therefore, even if the bezel is damaged during the detachment process and required to be replaced, the cover which is not detached from the casing along with the bezel is not required to be replaced; that is, the undamaged cover is not required to be scrapped along with the damaged bezel, thereby preventing the cover from being wasted and preventing the cost of the maintenance from increasing.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A casing assembly, adapted to be connected to a host assembly via at least one pivot component and configured to support a display panel, the casing assembly comprising:
   a casing, configured to support the display panel and configured to be connected to the at least one pivot component, wherein the casing has a bottom surface, a side surface, a first mount structure and a second mount structure, the bottom surface is connected to the side surface, and the first mount structure and the second mount structure are respectively located at the bottom surface and the side surface;
   a cover, comprising a covering portion, a first mount portion and a second mount portion, wherein the first mount portion and the second mount portion are connected to the covering portion, the first mount portion and the second mount portion are respectively connected to the first mount structure and the second mount structure of the casing; and
   a bezel, removably connected to the cover and the casing, wherein the display panel is located between the bezel and the casing;
   wherein the first mount structure protrudes from the bottom surface, the first mount structure has a support surface, the covering portion has an end surface, the end surface faces the support surface and is spaced apart from the support surface, the first mount portion protrudes from the end surface, at least one insertion slot is formed between the end surface and the support surface, the bezel has at least one insertion protrusion, and the at least one insertion protrusion is inserted into the at least one insertion slot.

2. The casing assembly according to claim 1, wherein the first mount structure has a first recess and a first groove, the second mount structure has a second recess and a second groove, the first mount portion of the cover comprises a first hook structure and a first protrusion, the first hook structure is engaged into the first recess, the first protrusion is inserted into the first groove, the second mount portion of the cover comprises a second hook structure and a second protrusion, the second hook structure is engaged into the second recess, and the second protrusion is inserted into the second groove.

3. The casing assembly according to claim 1, wherein the first mount structure has a first recess, the first mount portion of the cover is a first hook structure, the first hook structure is engaged into the first recess, the second mount structure has a second recess, the second mount portion of the cover is a second hook structure, and the second hook structure is engaged into the second recess.

4. The casing assembly according to claim 1, wherein the first mount portion is a first protrusion, the first mount structure has a first groove, the first protrusion is inserted into the first groove, the second mount portion is a second protrusion, the second mount structure has a second groove, and the second protrusion is inserted into the second groove.

5. The casing assembly according to claim 2, wherein the first mount structure further has a first inclined, the first hook structure has an inclined guide surface, the inclined guide surface of the first hook structure corresponds to the first inclined guide surface of the first mount structure, the second mount structure further has a second inclined guide surface, the second hook structure has an inclined guide surface, and the inclined guide surface of the second hook structure corresponds to the second inclined guide surface of the second mount structure.

6. A monitor, adapted to be connected to a host assembly via at least one pivot component, the monitor comprising:
   a casing assembly, comprising:
   a casing, configured to be connected to the at least one pivot component, wherein the casing has a bottom surface, a side surface, a first mount structure and a second mount structure, the bottom surface is connected to the side surface, and the first mount structure and the second mount structure are respectively located at the bottom surface and the side surface;
   a cover, comprising a covering portion, a first mount portion and a second mount portion, wherein the first mount portion and the second mount portion are connected to the covering portion, the first mount portion and the second mount portion are respectively connected to the first mount structure and the second mount structure of the casing; and
   a bezel, removably connected to the cover and the casing; and
   a display panel, located between the bezel and the casing;
   wherein the first mount structure protrudes from the bottom surface, the first mount structure has a support surface, the covering portion has an end surface, the end surface faces the support surface and is spaced apart from the support surface, the first mount portion protrudes from the end surface, at least one insertion slot is formed between the end surface and the support surface, the bezel has at least one insertion protrusion, and the at least one insertion protrusion is inserted into the at least one insertion slot.

7. The monitor according to claim 6, wherein the first mount structure has a first recess and a first groove, the second mount structure has a second recess and a second groove, the first mount portion of the cover comprises a first hook structure and a first protrusion, the first hook structure is engaged into the first recess, the first protrusion is inserted into the first groove, the second mount portion of the cover comprises a second hook structure and a second protrusion, the second hook structure is engaged into the second recess, and the second protrusion is inserted into the second groove.

8. The monitor according to claim 6, wherein the first mount structure has a first recess, the first mount portion of the cover is a first hook structure, the first hook structure is engaged into the first recess, the second mount structure has a second recess, the second mount portion of the cover is a second hook structure, and the second hook structure is engaged into the second recess.

9. The monitor according to claim 6, wherein the first mount portion is a first protrusion, the first mount structure has a first groove, the first protrusion is inserted into the first groove, the second mount portion is a second protrusion, the second mount structure has a second groove, and the second protrusion is inserted into the second groove.

10. The monitor according to claim 7, wherein the first mount structure further has a first inclined guide surface, the first hook structure has an inclined guide surface, the inclined guide surface of the first hook structure corresponds to the first inclined guide surface of the first mount structure, the second mount structure further has a second inclined guide surface, the second hook structure has an inclined guide surface, and the inclined guide surface of the second hook structure corresponds to the second inclined guide surface of the second mount structure.

11. A notebook computer, comprising:
a host assembly;
at least one pivot component, wherein the at least one pivot component is connected to the host assembly; and
a monitor, comprising:
a casing assembly, comprising:
a casing, wherein the at least one pivot component is connected to the casing, the casing has a bottom surface, a side surface, a first mount structure and a second mount structure, the bottom surface is connected to the side surface, and the first mount structure and the second mount structure are respectively located at the bottom surface and the side surface;
a cover, comprising a covering portion, a first mount portion and a second mount portion, wherein the first mount portion and the second mount portion are connected to the covering portion, the first mount portion and the second mount portion are respectively connected to the first mount structure and the second mount structure of the casing; and
a bezel, removably connected to the cover and the casing; and
a display panel, located between the bezel and the casing;
wherein the first mount structure protrudes from the bottom surface, the first mount structure has a support surface, the covering portion has an end surface, the end surface faces the support surface and is spaced apart from the support surface, the first mount portion protrudes from the end surface, at least one insertion slot is formed between the end surface and the support surface, the bezel has at least one insertion protrusion, and the at least one insertion protrusion is inserted into the at least one insertion slot.

12. The notebook computer according to claim 11, wherein the host assembly has two mount portions located opposite to each other, the at least one pivot component is two pivot components, the two pivot components are respectively mounted in the two mount portions, the quantity of the cover is merely one, and the cover is located between the two mount portions.

13. The notebook computer according to claim 11, wherein the first mount structure has a first recess and a first groove, the second mount structure has a second recess and a second groove, the first mount portion of the cover comprises a first hook structure and a first protrusion, the first hook structure is engaged into the first recess, the first protrusion is inserted into the first groove, the second mount portion of the cover comprises a second hook structure and a second protrusion, the second hook structure is engaged into the second recess, and the second protrusion is inserted into the second groove.

14. The notebook computer according to claim 11, wherein the first mount structure has a first recess, the first mount portion of the cover is a first hook structure, the first hook structure is engaged into the first recess, the second mount structure has a second recess, the second mount portion of the cover is a second hook structure, and the second hook structure is engaged into the second recess.

15. The notebook computer according to claim 11, wherein the first mount portion is a first protrusion, the first mount structure has a first groove, the first protrusion is inserted into the first groove, the second mount portion is a second protrusion, the second mount structure has a second groove, and the second protrusion is inserted into the second groove.

16. The notebook computer according to claim 13, wherein the first mount structure further has a first inclined guide surface, the first hook structure has an inclined guide surface, the inclined guide surface of the first hook structure corresponds to the first inclined guide surface of the first mount structure, the second mount structure further has a second inclined guide surface, the second hook structure has an inclined guide surface, and the inclined guide surface of the second hook structure corresponds to the second inclined guide surface of the second mount structure.

* * * * *